United States Patent [19]

Kenny et al.

[11] Patent Number: 5,436,452
[45] Date of Patent: Jul. 25, 1995

[54] UNCOOLED TUNNELING INFRARED SENSOR

[75] Inventors: Thomas W. Kenny, Glendale; William J. Kaiser, West Covina; Judith A. Podosek, Arcadia; Erika C. Vote, Pasadena; Richard E. Muller, Sunland; Paul D. Maker, Arcadia, all of Calif.

[73] Assignee: California Institute of Technology, Pasadena, Calif.

[21] Appl. No.: 79,507

[22] Filed: Jun. 21, 1993

Related U.S. Application Data

[63] Continuation-in-part of Ser. No. 898,682, Jun. 15, 1992, Pat. No. 5,298,748.

[51] Int. Cl.⁶ .......................... G01J 5/00; H01J 37/00
[52] U.S. Cl. ................................ 250/338.1; 250/306
[58] Field of Search ................ 250/338.1, 306, 423 F

[56] References Cited

U.S. PATENT DOCUMENTS

| | | | |
|---|---|---|---|
| 3,887,937 | 6/1975 | Gatos et al. | 250/370.14 |
| 4,906,840 | 3/1990 | Zdeblick et al. | 250/307 |
| 5,043,577 | 8/1991 | Pohl et al. | 250/306 |
| 5,051,379 | 9/1991 | Bager et al. | 437/8 |
| 5,103,174 | 4/1992 | Wandass et al. | 324/209 |
| 5,265,470 | 11/1993 | Kaiser et al. | 73/178 R |
| 5,290,102 | 3/1994 | Kaiser et al. | 324/120 |
| 5,298,748 | 3/1994 | Kenny | 250/338.1 |

Primary Examiner—Bruce C. Anderson
Attorney, Agent, or Firm—Leonard Tachner

[57] ABSTRACT

An uncooled infrared tunneling sensor in which the only moving part is a diaphragm which is deflected into contact with a micromachined silicon tip electrode prepared by a novel lithographic process. Similarly prepared deflection electrodes employ electrostatic force to control the deflection of a silicon nitride, flat diaphragm membrane. The diaphragm exhibits a high resonant frequency which reduces the sensor's sensitivity to vibration. A high bandwidth feedback circuit controls the tunneling current by adjusting the deflection voltage to maintain a constant deflection of the membrane. The resulting infrared sensor can be miniaturized to pixel dimensions smaller than 100 μm. An alternative embodiment is implemented using a corrugated membrane to permit large deflection without complicated clamping and high deflection voltages. The alternative embodiment also employs a pinhole aperture in a membrane to accommodate environmental temperature variation and a sealed chamber to eliminate environmental contamination of the tunneling electrodes and undesireable accoustic coupling to the sensor.

19 Claims, 7 Drawing Sheets

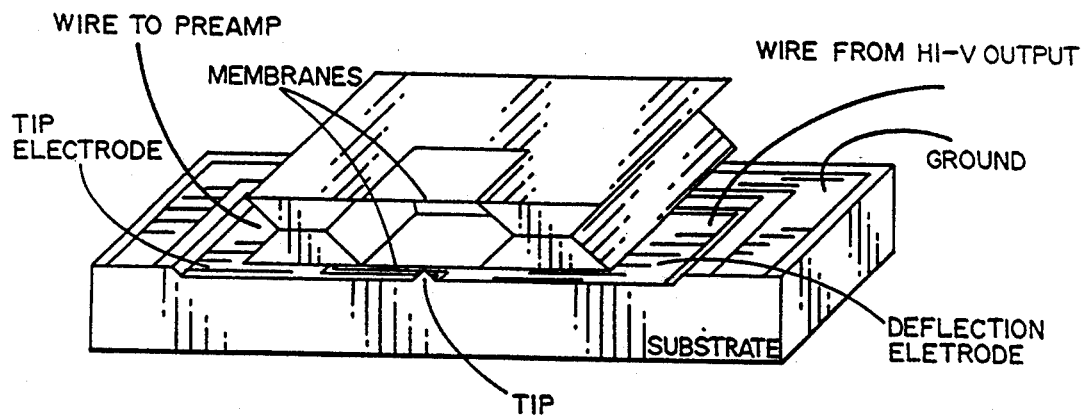
FIG. 10
FIG. 11
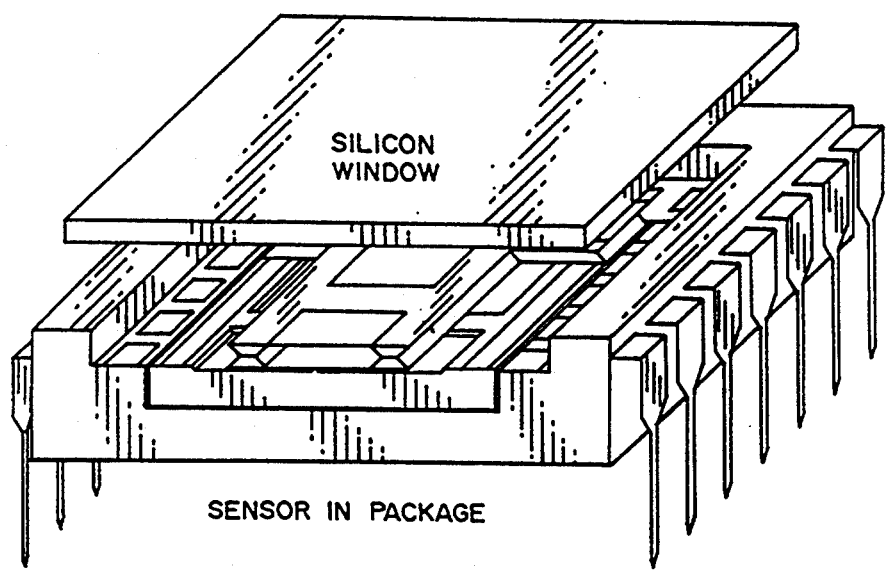

UNCOOLED TUNNELING INFRARED SENSOR

ORIGIN OF INVENTION

The invention described herein was made in the performance of work under a NASA contract, and is subject to the provisions of Public Law 96-517 (35 USC 202) in which the Contractor has elected to retain title.

CROSS-REFERENCE TO RELATED APPLICATION

This application is a continuation-in-part of application Ser. No. 07/898,682 filed on Jun. 15, 1992, now U.S. Pat. No. 5,258,748

TECHNICAL FIELD

The present invention relates generally to infrared sensors and more specifically to a tunneling transducer having a membrane within tunneling distance of a micromachined tip and having a feedback circuit to electrostatically retain that distance despite infrared energy-induced mechanical forces whereby the feedback circuit provides quantification of incident infrared energy.

BACKGROUND ART

Instruments for the measurement of infrared radiation are becoming increasingly important for a variety of commercial and non-commercial applications. Research into the development of uncooled sensors with response throughout the infrared spectrum has become particularly important due to the limitations on the operation of cooling systems. Uncooled infrared sensors would have important applications for space-based remote-sensing of thermal sources, night vision, target identification, thermal mapping, event detection, motion detection, and others. The limitations of the performance of the existing uncooled sensors often are the primary constraint to the performance of infrared imaging systems for many applications. As a result, there has been considerable investment in the development of uncooled infrared sensors.

A broad assortment of infrared detectors has been developed, over the last 40 years. In most cases, they may be classified as either quantum or thermal detectors, depending upon whether the incoming radiation is converted to excitations which are collected, or is converted to heat and detected through changes in temperature. In general, a quantum detector which operates at detector temperature $T_d$ is usually superior to a thermal detector at the same temperature for infrared frequencies: $h\nu >> k_B T_d$, where h is Planck's constant and $K_B$ is Boltzmann's constant. However, for infrared frequencies: $h\nu << k_B T_d$, thermal detectors represent the only functional technology. The operation of quantum detectors is limited by the availability of efficient photon conversion mechanisms, while the operation of thermal detectors is limited by the availability of sensitive thermometers. Only thermal infrared sensors operate in the mid-to-far infrared ($\lambda > 10\mu m$) and at room temperature.

The pneumatic infrared detector, which was originally developed by Golay, is classified as a thermal detector. Golay's detector consisted of a small cavity filled with gas at room temperature. The cavity is separated from the surroundings by a window and a thin, flexible membrane. The membrane was coated on one side with a thin metallic film, which has significant absorption throughout the infrared spectrum whenever the sheet resistance of the film is approximately half of the impedance of free space. The trapped gas in the Golay cell was heated by contact with the membrane and expanded thermally, which forced the membrane to deflect outward. This deflection is usually detected with optical or capacitive displacement transducers. At present, these detectors are bulky, fragile, difficult to fabricate, and expensive. Nevertheless, they have been widely used, primarily because of their improvement in sensitivity over all other room-temperature detectors in the mid to far infrared range. Attempts to miniaturize the Golay cell for incorporation into focal plane arrays have been unsuccessful because of scaling laws which relate the sensitivity of conventional displacement transducers and their active area. The need for focal-plane arrays of uncooled detectors stimulated the development of pyroelectric detector arrays, the best of which are 5-10 times less sensitive than the Golay cell.

With the above considerations in mind, the present invention is based on the development of an improved Golay cell. This new sensor is constructed entirely from micromachined silicon components. To detect the motion of the membrane, the invention uses an electron tunneling displacement transducer. This sensor, like the assemblies used in Scanning Tunneling Microscopy (STM), detects electrons which tunnel through the classically forbidden barrier between a tip and a surface. As in the STM, the electron current is exponentially dependent on the separation between the tip and the surface. Through use of the electron tunneling transducer, the scaling laws which have prevented the miniaturization of the Golay cell are avoided.

Any new developments in transducer technology that avoid the constraints which relate to the sensitivity and dimensions of classical displacement transducers are very important. The STM, which was invented by G. Binnig and H. Rohrer of IBM Zurich and won the 1986 Nobel Prize in Physics, is based on the measurement of electron tunnel current between a surface of interest and a sharp tip, while the tip is raster-scanned across the surface. This device is capable of resolving atomic-scale structure on the surface of interest and has enabled many pioneering discoveries of the structure, and behavior of atoms at surfaces. The most important element of STM is the measurement of tunneling current between the tip and substrate. The tunneling current, I, has the following dependence on the separation, s, between a pair of metallic electrodes:

$$I \propto V\exp(-\alpha \sqrt{\Phi}\, s),$$

where is the height of the tunneling barrier and V is the bias voltage; V is the small compared to $\Phi$, and $\alpha = 1.025$ ($\overset{\circ}{A}^{-1} eV^{-\frac{1}{2}}$). For typical values of $\Phi = 5$ eV and $s = 7$ Å, the current varies by nearly an order of magnitude for each 1 Å change in electrode separation. This sensitivity to relative position is superior to that available in all conventional compact transducers. Since tunneling only occurs in regions where the tip is within several Å of the surface, the active area of the sensor is microscopic. The use of electron tunneling as the active element of a displacement transducer for generic sensor purposes has been pioneered at the Jet Propulsion Laboratory (JPL) over the last several years resulting in the construction of a series of proof-of-concept prototypes. These prototypes initially were constructed from a variety of materials, and served to illustrate that, if designed properly, tunneling could be used in a displacement transducer.

STATEMENT OF THE INVENTION

The present invention comprises an uncooled infrared tunneling sensor in which the only moving part is a membrane which is deflected into contact with a micromachined silicon tip electrode prepared by a novel lithographic process. Similarly prepared deflection electrodes employ electrostatic force to control the deflection of a silicon nitride, flat diaphragm membrane. The membrane exhibits a high resonant frequency which reduces the sensor's sensitivity to vibration. A wide bandwidth feedback circuit controls the tunneling current by adjusting the deflection voltage to maintain a constant deflection of the membrane which would otherwise change deflection depending upon incident infrared radiation. The resulting infrared sensor can meet or exceed the performance of all other broadband, uncooled, infrared sensors and can be miniaturized to pixel dimensions of 100 µm. The technology can be readily implemented as a small-format linear array suitable for commercial and spacecraft applications. One embodiment of the invention is implemented with a number of further improvements which enable simplified fabrication and more routine operation without complicating non-ideal characteristics enountered in earlier embodiments. These improvements include: Use of a corrugated diaphragm to increase flexibility over a larger deflection range; use of a membrane pinhole aperture to eliminate dc-sensitivity of the sensor to environmental temperature variations; and use of a sealed chamber with a silicon wafer as an infrared window to eliminate environmental contamination of the tunneling electrodes and acoustic coupling to the sensor.

OBJECTS OF THE INVENTION

It is therefore a principal object of the present invention to provide a broadband, uncooled, tunneling infrared sensor which employs an electrostatically stabilized membrane and a feedback circuit to detect infrared radiation.

It is an additional object of the invention to provide an uncooled, broadband, tunneling infrared sensor that utilizes a membrane within tunneling distance of a micromachined tip and comprising a feedback circuit to electrostatically retain that distance despite mechanical forces tending to deflect the membrane.

It is still an additional object of the invention to provide a tunneling infrared sensor having micromachined silicon components.

It is still an additional object of the present invention to provide a tunneling infrared sensor having a mechanical structure including a deflectable membrane wherein the resonant frequency is greater than 30 KHz.

It is still an additional object of the present invention to provide a tunneling infrared sensor employing a corrugated silicon nitride membrane to permit large deflections without requiring complicated clamping structures or extremely high deflection voltages to overcome membrane stiffness.

It is still an additional object of the present invention to provide a tunneling infrared sensor having lithographically prepared, atomically clean, gold tunneling electrodes.

It is still an additional object of the present invention to provide a tunneling infrared sensor that is relatively insensitive to environmental temperature variations.

It is still an additional object of the present invention to provide a tunneling infrared sensor which is configured to eliminate environmental contamination of the tunneling electrodes and acoustic coupling to the sensor.

BRIEF DESCRIPTION OF THE DRAWING

The aforementioned objects and advantages of the present invention, as well as additional objects and advantages thereof, will be more fully understood hereinafter as a result of a detailed description of a preferred embodiment when taken in conjunction with the following drawings in which:

FIG. 10 is a drawing of an assembled tunneling infrared sensor in accordance with the alternative embodiment; and FIG. 11 is a drawing illustrating the assembled sensor of FIG. 10 in a dual in-line electrical package prior to attachment of a silicon window.

DETAILED DESCRIPTION OF THE INVENTION

Figure 1:
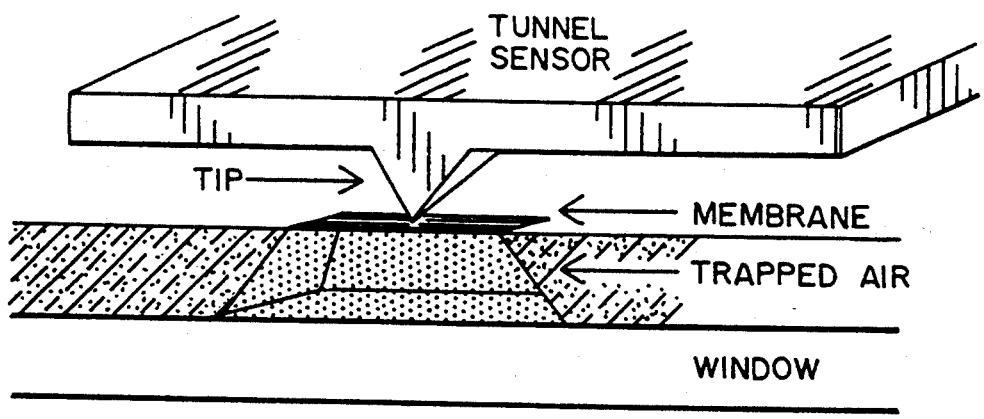
FIG. 1 is a drawing of a tunneling infrared sensor demonstrating the concept of using a tunneling displacement transducer to measure deflection of a membrane driven by infrared-induced expansion of trapped gas.

The present invention utilizes an electron tunneling displacement transducer composed of micro-machined silicon. Micromachining has been used to produce cm-scale components with µm-scale precision. Micromachining offers a favorable fabrication technology because it allows for miniaturization and integration with electronics. This device was designed for incorporation into an infrared de rector and was optimized to make assembly and testing of the IR detector convenient.

The relative position of the deflection electrodes in the inventive transducer is controlled through use of electrostatic forces applied between the elements. The electrostatic forces induce deflection of a gold-coated micro-machined silicon nitride membrane. Replacement of conventional piezoelectric actuators with an electrostatic actuator is important for the following reasons: First, the electrostatic actuator is insensitive to thermal drifts and immune to the problems of creep associated with piezoelectric actuators. Second, the response of the electrostatic actuator is a function only of the geometry and mechanical properties of the device, whereas the response of piezoelectric actuators is also dependent on the characteristics of the material, which may not be reproducible between devices or over time. Finally, the electrostatic actuator may be miniaturized more easily because the scaling laws are known exactly, and the fabrication is less complex than for the piezoelectric actuator.

Tunneling sensors are fabricated by the following lithographic procedure: Silicon wafers which have already been micromachined to form 30 μm deep recesses with tips are passivated with 1 μm $SiO_2$ using a standard steam oxidation process. These wafers are spin-coated with photoresist, and exposed to a lithographic pattern which is used to define the electrode pattern. After development, which removes the exposed photoresist, the wafers are treated in a plasma of $O_2$, which removes organic residue from the open areas in the photoresist pattern, and sharpens the edge profile of the photoresist.

Metal is then deposited on the photoresist-coated wafer. Gold does not adhere well to clean $SiO_2$, so an adhesion layer of another metal is required before the gold is deposited. Typically, chrome is used, because the first chrome layers deposited readily oxidize, and bond well to $SiO_2$, while the last layers are metallic, and bond well to the gold. Unfortunately, chrome can migrate through the gold layer, eventually forming a nonconductive $Cr_2O_3$ layer on the surface. We have experimentally observed the failure of devices due to the appearance of chrome on the surface of the gold tunneling electrodes. After numerous experiments, we have found that a titanium adhesion layer (150 Å), followed by a platinum barrier layer (150 Å), followed by a gold electrode layer (2000 Å) produces atomically clean gold electrodes. The use of a barrier layer has been widely used in industrial applications by others to prevent diffusion of the electrode metal down into GaAs substrates. We are the first to use such a metal system to prepare atomically clean electrodes for tunneling.

After deposition of the metal layers, the wafer is submerged in a photoresist dissolving solvent (such as acetone) and agitated ultrasonically. The agitation is required for the solvent to soak under the metal which is deposited on photoresist and lift it off.

Finally, the wafers are diced by a standard dicing saw, degreased with TCE, acetone, and methanol, and then treated in plasma of $O_2$ for an extended time. The $O_2$ plasma removes residual hydrocarbons from the gold electrode surfaces.

As a result of this process, patterned, clean electrodes are produced which are suitable for use in a miniature tunneling transducer.

The electron tunneling displacement transducer described above was designed to be used with an infrared sensor. The design of the other components of the infrared sensor was guided by a calculation of its sensitivity. The response and noise of the prototype electron tunneling infrared de rector are calculated as for a generic thermal detector. It is important to note that this prototype has not been fully optimized to achieve the best possible sensitivity.

A cavity of area 0.01 $cm^2$ and thickness 0.015 cm, filled with air at atmospheric pressure is trapped between a pair of silicon wafers, one of which has been etched through to a 0.5 μm thick silicon oxynitride membrane as shown in FIG. 1. The outer surface of the membrane is coated with ~100 Å of gold to serve as an electrode for tunneling as well as an efficient absorber of infrared radiation. The heat capacities of the gas, membrane, and gold films sum to $C=7.9 \times 10^{-7}$ J/K, and the thermal conductances between these elements and the surroundings sum to $G=1.9 \times 10^{-4}$ W/K. The heat capacity is dominated by the membrane, while the thermal conductance is dominated by conduction through the trapped gas to the window. The mechanical properties of the membrane may be calculated, given its dimensions. The coefficient of motion (change in position per unit change in temperature) of the center of the membrane is approximately $1 \times 10^{-4}$ cm/K, assuming that air is an ideal gas at room temperature and pressure. When biased at fixed voltage, the tunneling current has the following dependence on tip-substrate separation:

$$I = I_0 \exp(-\beta \sqrt{\Phi} s), \quad (2)$$

where $\Phi$ is the tunnel barrier height in eV, s is the tip-membrane separation in Å, and $\beta$ is a conversion factor with a value of 1.025 $eV^{-\frac{1}{2}} Å^{-1}$. The combined temperature coefficient (fractional change in current per unit change in temperature) of trapped gas and tunnel sensor is $\alpha = (1/I)(\partial I/\partial T) = 2.3 \times 10^4$/K for $\Phi=5$ eV. This large temperature coefficient is a product of the large thermal expansion of gases at room temperature, and the extreme sensitivity of vacuum tunneling to changes in relative position. For comparison, $\alpha$ for a high performance resistance bolometer is approximately equal to 1. The responsivity of the electron tunneling infrared detector is then given by:

$$S = \frac{I\alpha}{(G^2 + (\omega C)^2)^{\frac{1}{2}}} = 1.2 \times 10^{-1} A/W(\omega = 0). \quad (3)$$

The contributions of several kinds of noise must be considered. For each source, an expression for the square off the Noise Equivalent Power, $(NEP)^2$ appears. The NEP is defined as the signal power that would be detected with a unity signal-to-noise ratio in the presence of a given source of noise. The NEP is an important figure of merit for infrared detectors. The expression for the NEP refers to a bandwidth of 1 Hz. Since the noise sources being considered are broadband, reducing the bandwidth of the measurement (increasing the integration time) is expected to improve the sensitivity. An absorber efficiency of 100% is assumed in this expression.

The expression for the NEP of a thermal infrared detector is:

$$(NEP)^2 = 4k_B T^2 G + \frac{2e(G^2 + (\omega C)^2)}{I\alpha^2} + 16A\sigma k_B T^5. \quad (4)$$

The first term arises due to temperature fluctuations in the trapped gas, the second term is due to shot noise in the tunnel current, and the third term is due to photon noise. In the is expression, $k_B$ is Boltzmann's constants, T is the operating temperature, $\omega$ is the modulation frequency., A is the absorbing area of the detector, and σ is the Stefan-Boltzmann constant. Ideally, photon noise would be the largest term in the expression for the NEP.

Noise in amplifiers should not play an important role due to the large transducer sensitivity. Commercial operational amplifiers are readily available that contribute less than the shot noise term to the NEP. A prototype tunneling transducer was fabricated from micromachined silicon and made operational to investigate unexpected noise sources, such as 1/f noise. Over the range of frequencies investigated (2 Hz–10 kHz), all sources of transducer noise were smaller than the expected thermal noise from Equation 4.

Figure 2:
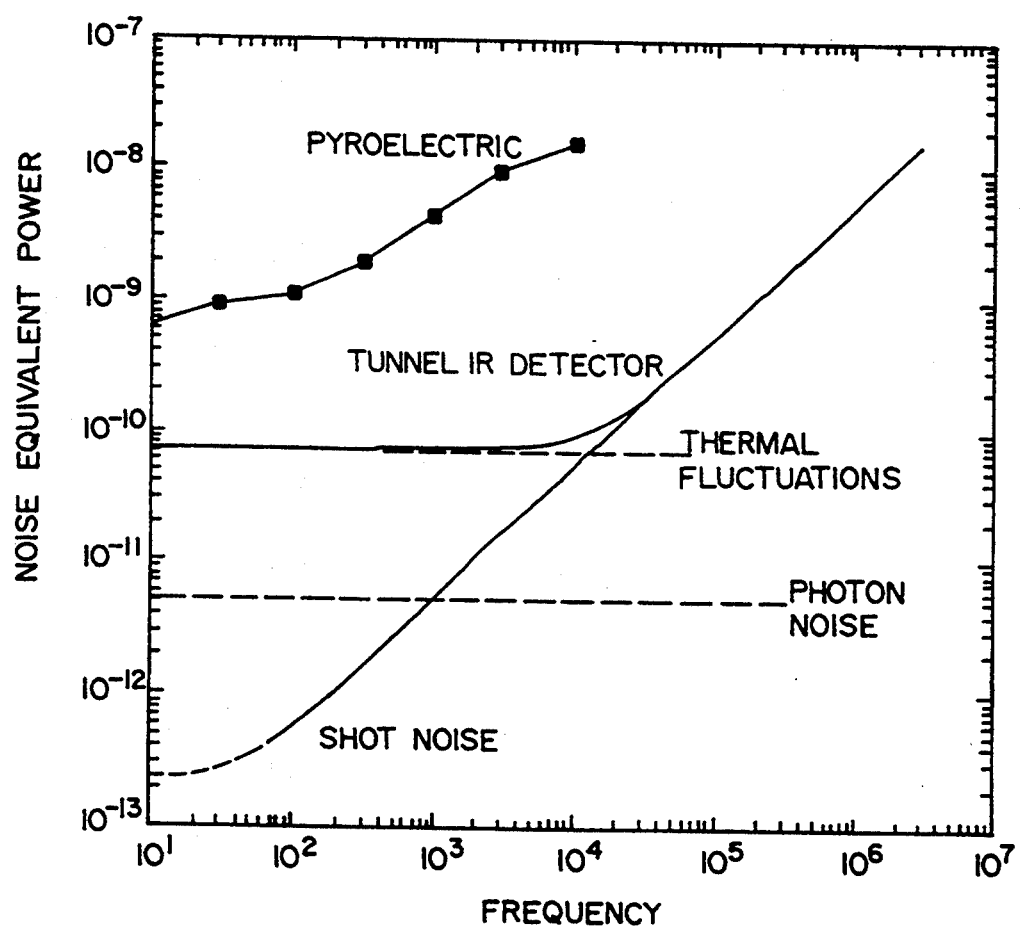
FIG. 2 is a graph illustrating noise sources affecting infrared detector sensitivity.

If one sums these contributions to the noise, and consider the 50% efficiency of the absorber, the predicted NEP of the prototype is $6 \times 10^{-11}$ W/$\sqrt{Hz}$ at chopping frequencies below 10 kHz. At frequencies below 10 kHz, the NEP is dominated by thermal fluctuations. At frequencies above 10 kHz, the contribution from shot noise dominates the other sources of noise and degrades the NEP of the detector. The calculated contributions to the NEP of the prototype are plotted as a function of frequency in FIG. 2.

Figure 3:
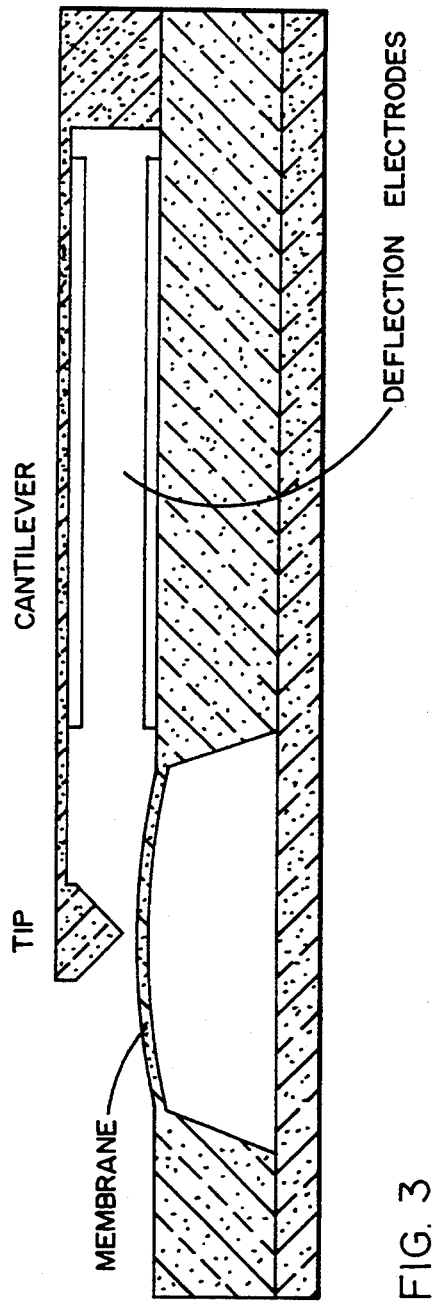
FIG. 3 is a conceptual drawing of a prototype transducer used to demonstrate the concept of the present invention.

A prototype electron tunneling infrared sensor has been fabricated. It is illustrated in FIG. 3. The prototype infrared sensor was made operational and infrared response was observed with a variety of laboratory blackbody sources. A careful calibration was carried out by chopping between 300° K. and 77° K. blackbodies with area 1 cm$^2$ located 10 cm from the sensor. Considering the geometric factors and allowing for atmospheric transmittance from source to sensor, the average modulated signal power at the sensor was $1.6 \times 10^{-7}$ W. The signal to noise ratio at the chopping frequency of 10 Hz was measured to be 200/$\sqrt{Hz}$, so the experimental NEP of the prototype infrared sensor is $8 \times 10^{-10}$ W/$\sqrt{Hz}$. Noise in this prototype was dominated by the sensitivity of the transducer to mechanical vibration.

The measured sensitivity of the tunneling infrared sensor is already competitive with the best commercial pyroelectric sensors and can be readily improved by an order of magnitude through the use of an optimized transducer.

The prototype tunneling infrared sensor described above was designed to demonstrate the concept of an infrared sensor based on the tunneling displacement transducer. Since it relied upon the first use of a tunneling device made entirely from micromachined silicon, certain characteristics were selected to allow easy operation, instead of optimized sensitivity. With the successful demonstration of this concept, it was appropriate to consider designs that optimize performance.

It is important for any infrared sensor to be insensitive to environmental sources of noise. For example, an infrared detector should not be especially sensitive to vibration. As is well known, early STMs were extraordinarily sensitive to vibration, and required the construction of large, complex vibration isolation systems in order to be used. In order to adapt tunneling for use as a transducer for real applications, the sensitivity to vibration, as well as other environmental stimuli, such as temperature and pressure, must be reduced. Since the tunneling infrared sensor is fundamentally a mechanical structure, the sensitivity to vibration is to be eliminated through careful mechanical design. When a mechanical element is subjected to an acceleration at frequencies below its resonance, the amplitude of deflection is inversely proportional to the square of the resonant frequency. Therefore, sensitivity to vibration is best reduced by increasing the resonant frequency of the elements of the transducer.

To meet the operational requirements for sensing applications of a tunneling infrared sensor, we have designed a new series of micromachined actuators. These new actuators are important because they are designed to offer resonant frequencies above 10 kHz. The new actuators achieve the higher resonant frequencies primarily through reduction in actuator mass by more than 4 orders of magnitude. As a result, the new actuators have smaller range of deflection (<5 μm), which precludes their use for coarse approach between tunneling electrodes. However, with the use of micromachining techniques, it is possible to assemble sensors with the electrode spacing already within the range of the fine control, thereby accomplishing the coarse approach during assembly.

Figure 5:
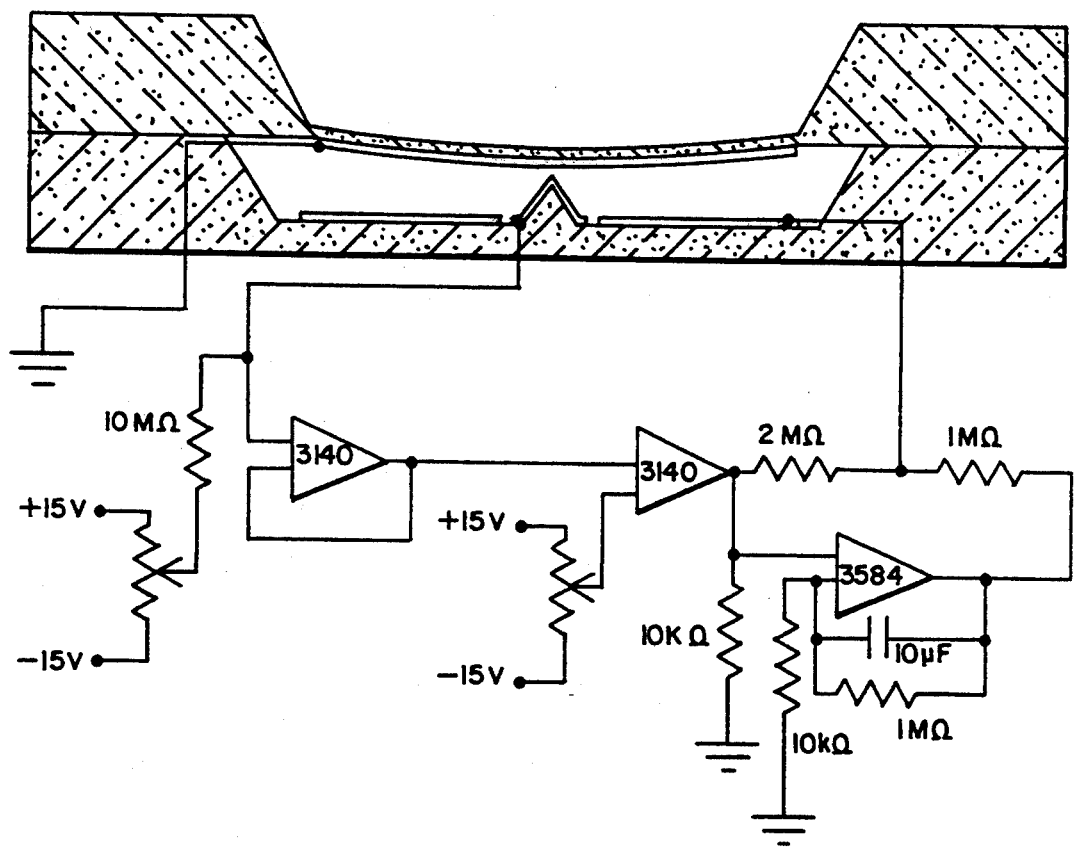
FIG. 5 is a schematic drawing of the infrared sensor of the invention including a feedback circuit used to control the tunneling transducer.

A wide-bandwidth actuator used in the present invention simply consists of a flat diaphragm. These diaphragms are fabricated by coating the front surface of a silicon wafer with low-stress LPCVD silicon nitride. The diaphragms are released by etching square holes through the wafer from the backside with a chemical etchant which does not etch silicon nitride, such as EDP. A drawing of a diaphragm positioned above the tunneling and deflection electrodes is shown in FIG. 5. This device is operated by applying a 150 mV tunneling bias to the tip and grounding the electrode on the membrane. A large voltage is applied to the deflection electrodes, electrostatically attracting the diaphragm down towards the tip. When the membrane is within 10 Å of the tip, a tunnel current of 1 nA appears. The feedback loop compares this current to a reference value and applies an error signal to the deflection electrode, thereby maintaining the position of the diaphragm. If a force is applied to the diaphragm, the feedback loop responds with a balancing force which keeps the diaphragm position fixed. When infrared radiation is absorbed in the sensor, the resulting change in pressure is sensed by the feedback circuit which responds by changing the deflection voltage. The variations in deflection voltage are proportional to variations in absorbed infrared power.

For the infrared sensor, the dimensions of the diaphragm are $2 \times 2$ mm$^2 \times 0.5$ μm. The resonant frequency and stiffness are calculated to be 20 kHz and 1 N/m respectively.

With the lowest mechanical resonant frequency of the sensor being above 10 kHz, the gain and bandwidth of the electrical circuit used to control the sensor may be substantially larger than that used in typical STMs or in previous tunneling sensors. Because of this, the feedback circuitry used may be simplified. FIG. 5 shows a typical feedback circuit that has been used to control tunneling between a micromachined tip and the diaphragm actuator.

A voltage drop across a 10 MOhm resistor in series with the tip occurs whenever tunneling occurs. A low noise FET input operational amplifier in follower configuration is used to lower the source impedance. In this configuration, the output of the first preamplifier never exceeds the range between the bias voltage of 150 mV and ground. We have found this preamplifier configuration to be more stable than other possible circuits, such as virtual ground configuration which drives the preamplifier all the way to the supply voltage in the event of a tip contact. A simple op-amp circuit is then used to compare the preamplifier output with a reference input and generate an error signal. This low-voltage, wide-bandwidth error signal must then be added to a high-voltage, narrow-bandwidth offset to produce the voltage which is applied to the deflection electrodes. The high voltage signal may be generated by a power supply which is periodically adjusted to keep the error signal near zero. A simple high voltage amplifier circuit with very low bandwidth can perform this function as well.

Figure 6:
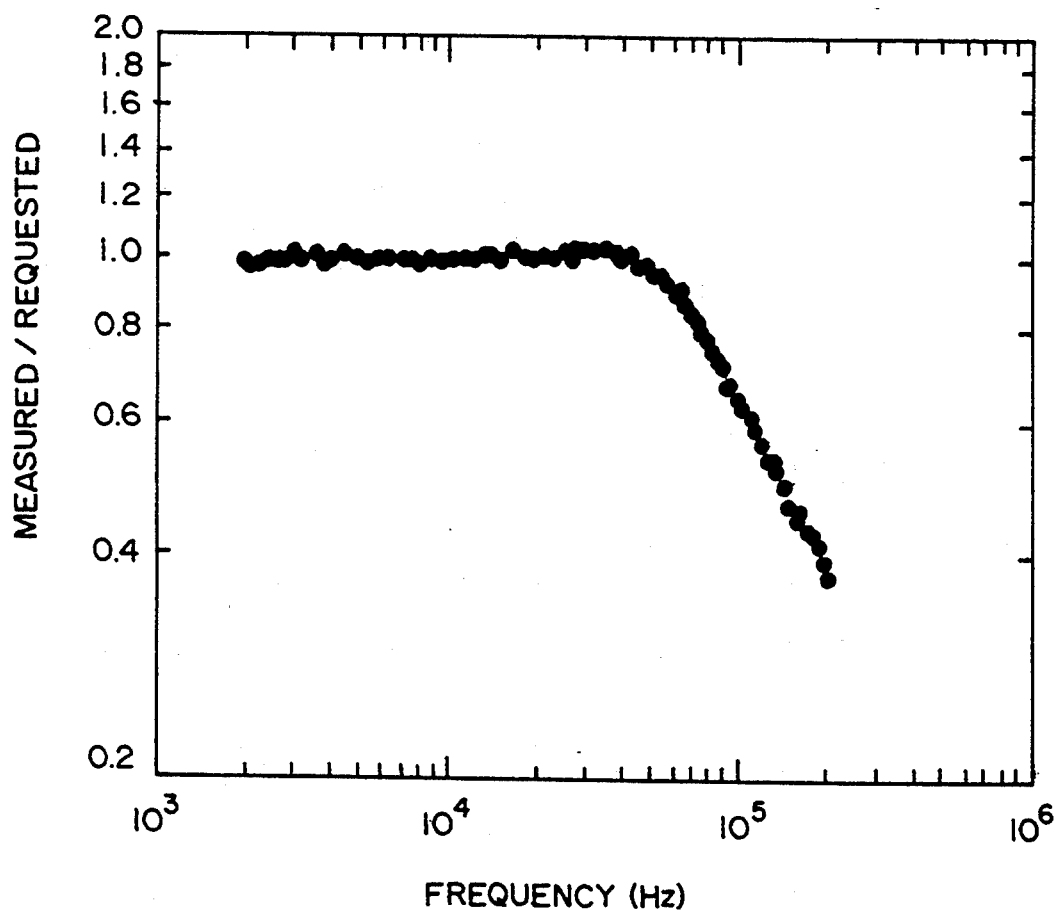
FIG. 6 is a graph of the ratio of measured to reference oscillations in the tunneling current as a function of frequency demonstrating a bandwidth measurement of 50 KHz.
Figure 7:
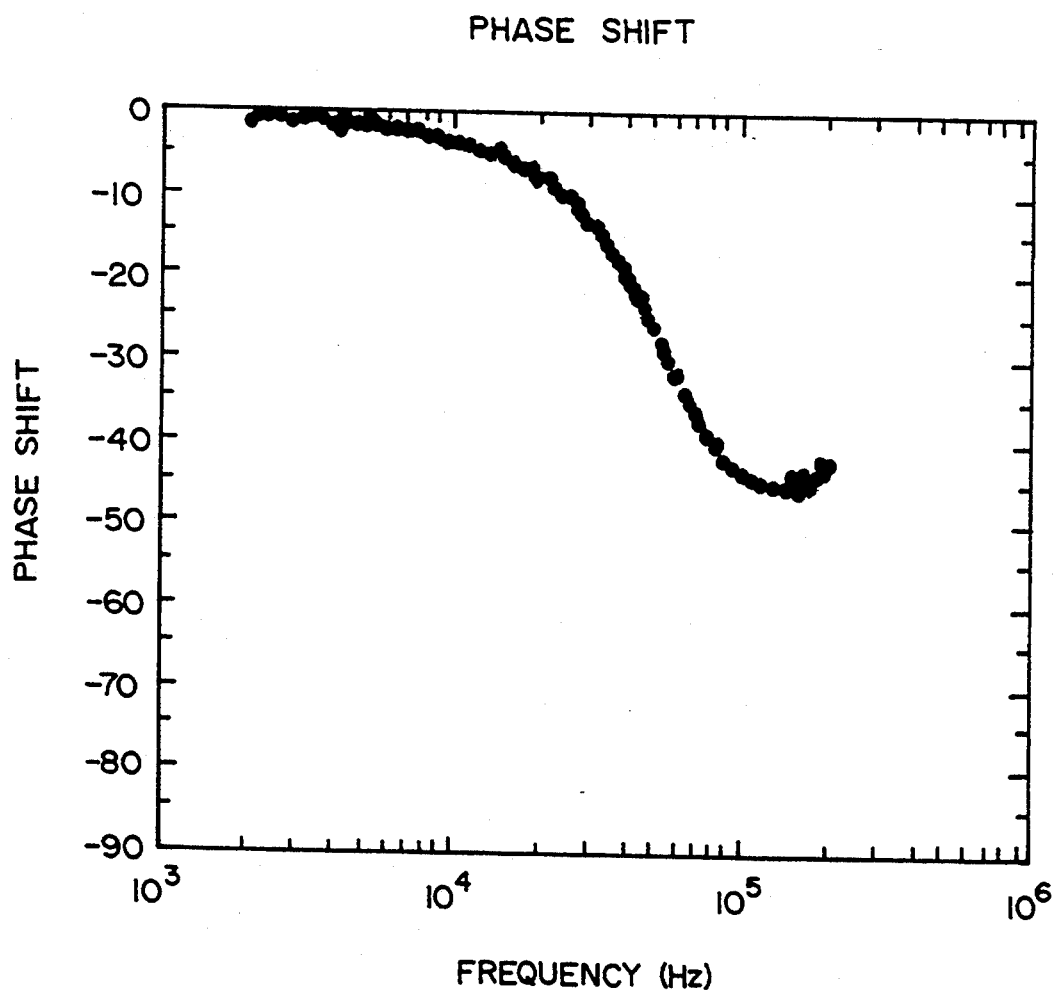
FIG. 7 is a graph of the measured phase shift versus frequency during the bandwidth measurement of FIG. 6.
Figure 8:
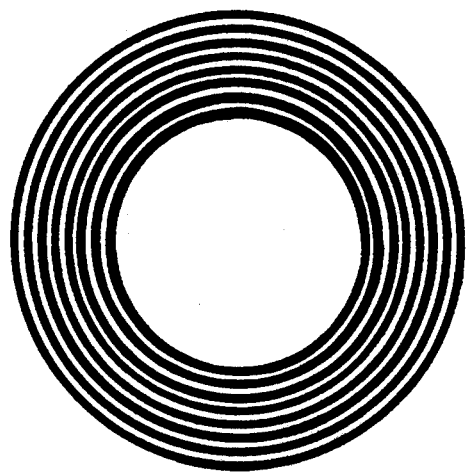
FIG. 8 is a drawing of pattern etching of concentric circular trenches in a silicon substrate forming corrugations in the membrane of the invention.

These transducers were made operational and routine characterizations were carried out. FIG. 6 shows a measurement of the bandwidth of the transducer. To carry out this measurement, a white noise voltage source is added to the reference input of the feedback loop. The feedback loop responds by generating a corresponding amplified signal with a white noise distribution at the deflection electrode, which causes fluctuations in the position of the diaphragm, as well as fluctuations in the tunneling current. FIG. 6 shows the ratio of the measured fluctuation amplitude to the reference fluctuation amplitude as a function of frequency as recorded by a standard spectrum analyzer. At all frequencies up to 50 kHz, the transducer is able to accurately reproduce the reference current fluctuations. Above 50 kHz, this response begins to roll off because of the bandwidth of the preamplifier. FIG. 7 shows the phase shift between the measured and requested current. This phase shift is less than (5 degrees for frequencies below 10 kHz, and increases to 30 degrees at 50 kHz. At frequencies above 100 kHz, capacitive coupling between the noise source and the transducer begins to contribute to the measurement, as evidenced by the variation in the phase shift at those frequencies.

Recent modifications to the design of the tunneling infrared sensor simplify fabrication and operation of the device. These modifications include incorporation of corrugated diaphragms for increased flexibility and lower voltage operation, submicron pinholes for long-term stability, and packaging techniques which allow use of hybrid-integrated circuitry and greatly simplified mounting and testing procedures. With these modifications, the performance has been enhanced to exceed that of all other commercially available uncooled infrared sensors. Operation of these sensors has been simplified to the extent that they have been shipped to non-expert users for routine testing and evaluation at their laboratories.

Figure 4:
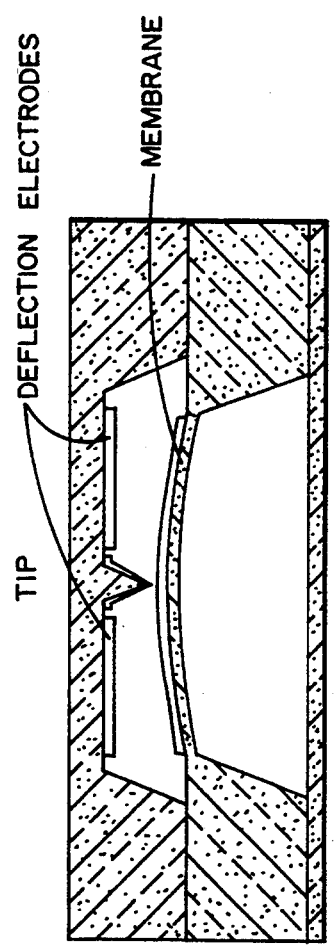
FIG. 4 is a conceptual drawing of the tunneling infrared sensor of the present invention.

The assembly and operation of the sensor of FIG. 4 was complicated by several non-ideal characteristics:

a) The silicon nitride membranes fabricated for the tunneling sensors suffered from stiffness which increased rapidly with deflection. For the required deflections of 3-5 $\mu$m, the stiffness increased from 1.5 N/m to more than 100 N/m. As a result, complicated clamping structures were required to reduce the tip-membrane separation, and extremely high deflection voltages (>400 V) were required.

b) The total pressure of gas trapped within the cell is strongly dependent on the temperature of the environment surrounding the sensor. As a result, the deflection voltage required to operate the sensor was subject to rapid drifts during normal operation. During typical operation, it was necessary to physically adjust the mounting clamps to compensate for changes in room temperature every half hour.

c) The tunneling electrodes, which are positioned below the gas volume, but exposed to air, are subject to contamination. Particularly severe contamination problems were observed during tests in high-humidity conditions.

d) The, sensor is also sensitive to acoustic vibration is present in the laboratory.

In spite of these behavioral complications, experiments were carried out which confirmed very good sensor performance. However, these behavioral complications would be unacceptable in any prototype sensor being prepared for delivery to a user laboratory.

Several modifications to the design, assembly and packaging of these sensors were incorporated in an alternate embodiment illustrated in FIGS. 8-11 to enable routine operation and delivery to user agencies. These modifications were:

a) Use of a corrugated diaphragm to increase flexibility over a larger deflection range.

b) Use of a 0.5 $\mu$m diameter pinhole in one of the membranes to eliminate dc-sensitivity of the sensor to environmental temperature variations.

c) Use of a sealed chamber with an infrared window to eliminate environmental contamination of the tunneling electrodes and acoustic coupling to the sensor.

These modifications have resulted in a set of tunneling infrared sensors which are appropriate for routine testing by non-experts at user laboratories and will now be described in more detail with reference to FIGS. 8-11.

It is well-known in the mechanical engineering community that the stiffness of flat diaphragms can increase rapidly for deflections larger than the thickness of the diaphragm. In the case of the tunneling infrared sensor, the diaphragm thickness is 0.5 $\mu$m, and the desired range of deflection is 3-5 $\mu$m. The introduction of corrugations into the diaphragm will delay the onset of the stiffness increase. Accordingly, a corrugated silicon nitride diaphragm may be fabricated in the following manner:

a) Prepare a high-resolution photo mask which consists of sets of concentric circular openings of even contrast and 20 $\mu$m pitch. (see FIG. 8)

b) Print this pattern on a photoresist-covered bare silicon wafer (of dimensions 3" in diameter×200 $\mu$m thickness in a standard configuration).

c) Etch the pattern 1 $\mu$m into the surface of the wafer using a reactive ion etching apparatus and sulfur hexafluoride as the etchant.

d) Grow a thick oxide on all surfaces of the wafer and then etch the oxide in hydrofluoric acid. This step smoothes the surface of the wafer, and rounds the circular trenches previously etched in the wafer.

e) Deposit 0.5 $\mu$m of low-stress silicon nitride using a low-pressure chemical vapor deposition system. This nitride conformally coats all surfaces of the wafer, including the rounded corrugations.

f) Etch square openings in the silicon nitride on the side of the wafer opposite to the previous etching of the circular trenches.

g) Etch the entire wafer in a silicon etching solution such as potassium hydroxide until the membranes are released.

The corrugated diaphragms fabricated in this way were immediately incorporated into a set of tunneling infrared sensors with the following results: The mechanical clamping structure used to help overcome the initial tip-membrane separation could be greatly simplified; and the operating voltages of the tunneling infrared sensors were reduced to below 150 V for all sensors and as low as 40 V for several sensors, allowing simplification of the feedback circuitry.

The variations in operating voltage with room temperature can be eliminated by introduction of a small leak in the gas cavity, allowing the pressure to equilibrate. It is important that this leak be very small, so as to preserve the detection of the raidation-induced pressure fluctuations at >5 Hz frequencies. Given the dimensions of the cavity, and the thickness of the diaphragm, molecular dynamics calculations indicate that a pinhole diameter of 0.5 $\mu$m is required to achieve a 1 second time constant.

Since optical lithographic techniques available to the inventors cannot be utilized to reliably fabricate features of such size, are e-beam lithography system was again utilized. Optical lithographic techniques may also be used if sufficient resolution is available. The procedure for the fabrication of the pinholes is:

a) Coat a 3"×200 $\mu$m wafer with 0.5 $\mu$m of low-stress silicon nitride on all surfaces.
b) Evaporate a 300 Å thick layer of aluminum on one side of the wafer.
c) Coat the aluminum-side of the wafer with e-beam photoresist, and expose a series of 0.5 $\mu$m-diameter openings in the photoresist.
d) Develop the resist, producing the 0.5 $\mu$m diameter openings.
e) Etch, the wafer in AZ 400K developer solution or any weak basic solution to remove the exposed aluminum under the e-beam written pinholes.
f) Etch the entire wafer in a reactive ion etching apparatus with carbon tetrafluroide gas to remove the silicon nitride under the openings in the aluminum.
g) Etch square openings in the silicon nitride on the opposite side of the wafer.
h) Etch the entire wafer in potassium hydroxide solution until the diaphragms have been relased. These diaphragms will have 0.5 $\mu$m openings already in place.

Figure 9:
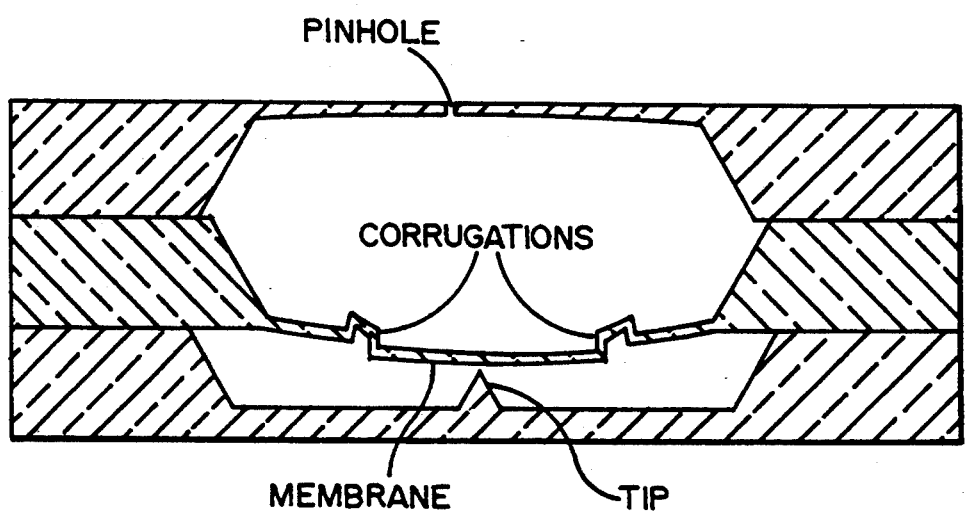
FIG. 9 is a conceptual drawing of an alternative embodiment of the invention illustrating the use of membrane corrugations and a membrane pinhole aperture to improve sensor performance.

Once fabricated, several of these perforated diaphragms were incorporated into tunneling infrared sensors. A drawing showing the location of the corrugations and perforation in the sensor is shown in FIG. 9. Measurements with these sensors confirmed that time-constants between 0.2 and 5 seconds were achieved. Tunneling infrared sensors based on these perforated membranes exhibited the following behavior: The operating voltage did not drift with the environmental temperature; and the sensor clamping structure could be eliminated entirely in favor of a completely bonded structure within a standard integrated circuit carrier. This packaging approach is shown in FIG. 10.

These sensors were tested in several environments and shown to be sensitive to environmental contamination of the electrodes as well as acoustic coupling to the room. These problems were both solved by sealing the sensor in a small volume of air within the integrated circuit test package with a silicon window. The silicon window is used because it is transparent in the infrared, mechanically stiff enought to eliminate acoustic coupling, inexpensive, and readily available. Other infrared windows may also be used. The final design of these tunneling infrared sensors is shown in FIG. 11.

Sensors incorporating these features of the alternative embodiment have been operated routinely over extended periods of time by users without expertise in the detailed operation of tunneling infrared sensors.

Having thus described an exemplary embodiment of the invention, what is claimed is:

1. An infrared sensor comprising:
an enclosed chamber;
a gas in said chamber;
a metal coated corrugated silicon nitride membrane forming a deflectable wall of said enclosed chamber;
a metal coated silicon tip within tunneling distance of said membrane for establishing a tunneling current therebetween depending upon said distance;
at least one electrode in spaced, opposing proximity to said membrane for electrostatically controlling the deflection of said membrane; and
a feedback circuit connected to said electrode for generating a servo feedback voltage for maintaining the deflection of said membrane irrespective of the level of infrared radiation incident upon said chamber, the variations in said servo feedback voltage being proportional to the variations in the level of infrared radiation incident upon said chamber.

2. The infrared sensor recited in claim 1 wherein said membrane is coated with gold.

3. The infrared sensor recited in claim 1 wherein said tip is coated with gold.

4. The infrared sensor recited in claim 1 wherein said membrane is coated with a layer of adhesion material, a layer of barrier material and a layer of metal.

5. The infrared sensor recited in claim 4 wherein said adhesion material is titanium.

6. The infrared sensor recited in claim 4 wherein said barrier material is platinum.

7. The infrared sensor recited in claim 4 wherein said metal is gold.

8. The infrared sensor recited in claim 1 wherein said tip is coated with a layer of adhesion material, a layer of barrier material and a layer of metal.

9. The infrared sensor recited in claim 8 wherein said adhesion material is titanium.

10. The infrared sensor recited in claim 8 wherein said barrier material is platinum.

11. The infrared sensor recited in claim 8 wherein said metal is gold.

12. The infrared sensor recited in claim 1 wherein said gas is air and wherein said chamber comprises an aperture of selected size, said aperture permitting limited air movement into and out of said chamber to compensate for environmental temperature variations.

13. The infrared sensor recited in claim 1 wherein said gas is xenon and wherein said chamber comprises an aperture of selected size, said aperture permitting limited xenon movement into and out of said chamber to compensate for environmental temperature variations.

14. In a tunneling infrared sensor of the type having a deflectable membrane forming a wall of an enclosed gas-filled chamber and an electrode tip for establishing a tunneling current dependent upon the deflection of said membrane in response to incident infrared radiation; the improvement comprising:
corrugation in said membrane;
at least one deflection electrode positioned in spaced relation to said membrane for electrostatically controlling the deflection of said membrane; and a feedback circuit connected between said tip and said electrode and responsive to said tunneling current for maintaining the deflection of said membrane within a selected range irrespective of the level of incident infrared radiation, 15. The improvement recited in claim 14 wherein said feedback circuit produces a voltage at said deflection electrode, the magnitude of variations in said voltage being proportional to the magnitude of variations in infrared radiation incident upon the sensor.

16. The improvement recited in claim 15 wherein said feedback circuit has a bandwidth of at least 50 kHz.

17. The improvement recited in claim 15 wherein said feedback circuit comprises:
   a resistor network to generate bias and reference voltages;
   a load resistor in series between said tip and ground;
   an operational amplifier whose inputs are connected to said tunneling tip and to a reference voltage and whose output is connected through a voltage divider to the deflection electrode and a voltage offset, respectively configured so that the weighted average of the operational amplifier output voltage and the offset voltage are applied to the deflection voltage.

18. The improvement recited in claim 14 wherein said membrane has a mechanical resonance frequency which is at least 10 kHz.

19. An infrared sensor comprising:
   a tunneling transducer configured for generating a tunneling current dependent upon the level of incident infrared radiation; said tunneling transducer having a tunneling tip and a deflection membrane;
   electrostatically controlled deflection means for retaining the deflection of said membrane substantially constant irrespective of said level of said infrared radiation; and
   a fixed membrane in spaced relation to said deflection membrane and forming a gas-filled chamber therebetween;
   said fixed membrane having an aperture of selected size for reducing the sensitivity of said sensor to environmental temperature variation.

* * * * *